US008683067B2

(12) United States Patent
Herz

(10) Patent No.: US 8,683,067 B2
(45) Date of Patent: Mar. 25, 2014

(54) VIDEO PERSPECTIVE NAVIGATION SYSTEM AND METHOD

(75) Inventor: William S. Herz, Hayward, CA (US)

(73) Assignee: Nvidia Corporation, Santa Clara, CA (US)

( * ) Notice: Subject to any disclaimer, the term of this patent is extended or adjusted under 35 U.S.C. 154(b) by 1321 days.

(21) Appl. No.: 12/004,668

(22) Filed: Dec. 19, 2007

(65) Prior Publication Data

US 2009/0160933 A1    Jun. 25, 2009

(51) Int. Cl.
*G06F 15/16* (2006.01)

(52) U.S. Cl.
USPC ............... 709/231; 709/232; 348/43; 348/51

(58) Field of Classification Search
USPC ............... 709/231, 232; 348/43, 51, E5.022, 348/E7.063, E7.7, E13.021; 725/100, 135, 725/144
See application file for complete search history.

(56) References Cited

U.S. PATENT DOCUMENTS

| | | | |
|---|---|---|---|
| 4,528,563 A | 7/1985 | Takeuchi | |
| 5,471,389 A | 11/1995 | Hahlganss | |
| 6,029,110 A | 2/2000 | Zuber et al. | |
| 6,087,961 A | 7/2000 | Markow | |
| 6,097,285 A | 8/2000 | Curtin | |
| 6,175,896 B1 | 1/2001 | Bui | |
| 6,181,996 B1 | 1/2001 | Chou et al. | |
| 6,587,770 B1 | 7/2003 | Gray et al. | |
| 6,684,176 B2 | 1/2004 | Willins et al. | |
| 6,731,204 B2 | 5/2004 | Lehmann | |
| 6,778,073 B2 | 8/2004 | Lutter et al. | |
| 6,876,298 B2 | 4/2005 | Litkouhi et al. | |
| 7,188,005 B2 | 3/2007 | Toba et al. | |
| 7,376,388 B2 * | 5/2008 | Ortiz et al. | 455/3.06 |
| 7,581,182 B1 | 8/2009 | Herz | |
| 7,649,444 B1 | 1/2010 | Fear et al. | |
| 7,685,619 B1 | 3/2010 | Herz | |
| 7,782,363 B2 * | 8/2010 | Ortiz | 348/211.8 |
| 7,813,621 B2 | 10/2010 | Agrahara | |
| 8,184,169 B2 * | 5/2012 | Ortiz | 348/211.8 |
| RE43,598 E * | 8/2012 | Alexander et al. | 702/188 |
| RE43,601 E * | 8/2012 | Arseneau et al. | 725/32 |
| 8,250,617 B2 * | 8/2012 | Hensgen et al. | 725/93 |
| 8,457,838 B1 | 6/2013 | Fear et al. | |
| 2002/0010655 A1 * | 1/2002 | Kjallstrom | 705/27 |
| 2003/0041110 A1 | 2/2003 | Wenocur et al. | |
| 2003/0208771 A1 * | 11/2003 | Hensgen et al. | 725/100 |
| 2004/0107449 A1 | 6/2004 | Fukuda et al. | |
| 2004/0119815 A1 * | 6/2004 | Soloff | 348/39 |
| 2004/0208494 A1 | 10/2004 | Green | |
| 2005/0240980 A1 * | 10/2005 | Jun et al. | 725/135 |
| 2006/0007963 A1 | 1/2006 | Kang et al. | |

(Continued)

FOREIGN PATENT DOCUMENTS

WO    2005016701    2/2005

*Primary Examiner* — LaShonda Jacobs

(57) ABSTRACT

A video navigation system and method can be utilized to efficiently and adjustably navigate video content. In one embodiment, a video information control method facilitates efficient video navigation. A video stream is received and video access point selection between multiple access points in said video stream is controlled. The presentation information is forwarded for each of the multiple access points. In one exemplary implementation, the presentation information is forwarded to a display and the information is directed to presenting a main viewing area and navigation areas that present looping video clips or portions of the video stream at time intervals ahead of and behind the video portion being presented in the main viewing area.

19 Claims, 12 Drawing Sheets

(56) References Cited

U.S. PATENT DOCUMENTS

| | | |
|---|---|---|
| 2006/0212833 A1 | 9/2006 | Gallagher et al. |
| 2006/0227871 A1 | 10/2006 | Budagavi |
| 2007/0032912 A1 | 2/2007 | Jung et al. |
| 2007/0033494 A1 | 2/2007 | Wenger et al. |
| 2007/0101394 A1* | 5/2007 | Fu et al. ......... 725/134 |
| 2007/0217518 A1 | 9/2007 | Valmiki et al. |
| 2007/0280298 A1* | 12/2007 | Hearn et al. ......... 370/498 |
| 2007/0283390 A1 | 12/2007 | Gordon et al. |
| 2008/0005348 A1* | 1/2008 | Kosiba et al. ......... 709/231 |
| 2009/0009605 A1* | 1/2009 | Ortiz ......... 348/157 |
| 2009/0074377 A1* | 3/2009 | Herz ......... 386/69 |
| 2009/0309975 A1* | 12/2009 | Gordon et al. ......... 348/159 |
| 2010/0289900 A1* | 11/2010 | Ortiz ......... 348/159 |
| 2011/0231428 A1* | 9/2011 | Kuramura ......... 707/769 |

* cited by examiner

| 720 | 721 | 722 | 723 |
|-----|-----|-----|-----|
| 724 | 725 | 726 | 727 |
| 728 | 729 | 730 | 731 |

310
Receiving a video stream.

320
Controlling video access point selection between multiple access points in said video stream.

330
Controlling video access point selection between multiple access points in said video stream.

FIG 3

```
                    Speaker
                     481

Speaker           TV              Speaker
    482              491              489

Primary
                     User
   Speaker           Area            Speaker
    483              492              488

Speaker          Speaker          Speaker
    484              485              487
```

FIG 4

VIDEO PERSPECTIVE NAVIGATION SYSTEM AND METHOD

FIELD OF THE INVENTION

The present invention relates to video navigation systems and methods.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, these advantageous results are realized through the use of video presentations. The video presentations typically provide information in a format that humans find easy to observe and digest significant amounts of data in relatively short periods of time. However, video presentations are often limited to one presentation perspective.

Traditional attempts at video presentation are usually limited to presentation from one perspective of viewing angle and/or audio sound effects. Conventional approaches to providing different perspectives typically subject the user to viewing substantially the entire content multiple times. Approaches that simply rely on presenting the video from one perspective and then at a later time presenting the video again from another perspective subject a user to essentially waiting through the first presentation and then the second presentation. For example, conventional sporting event replays of the same action from different perspectives.

SUMMARY

Description of a video perspective navigation system and method are presented in accordance with embodiments of the present invention. The present invention, video perspective navigation systems and methods can be utilized to efficiently and flexibly navigate and experience video content from a variety of perspectives. In one embodiment, a video information control method facilitates efficient video perspective navigation. A video stream information is received and video access point selection between multiple access points associated with different perspectives is controlled. The multiple access points correspond to access points in said video stream information. The presentation information is rendered for each of the multiple access points associated with the different perspectives. In one exemplary implementation, the presentation information is forwarded to a display and the information is directed to presenting a main viewing area for presenting a content perspective a user is primarily interested in and navigation areas that present video clips of perspectives different from the perspective being presented in the main viewing area. In one exemplary implementation, a user can trigger "movement" of content perspective from a navigation viewing area to the main viewing area.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 1D is an exemplary raster pattern video navigation presentation in accordance with one embodiment of the present invention.

FIG. 3 is a flow chart an exemplary video information control method in accordance with one embodiment of the present invention.

FIG. 4 is a block diagram of an exemplary presentation area in accordance with one embodiment of the present invention.

DETAILED DESCRIPTION

Figure 1A:
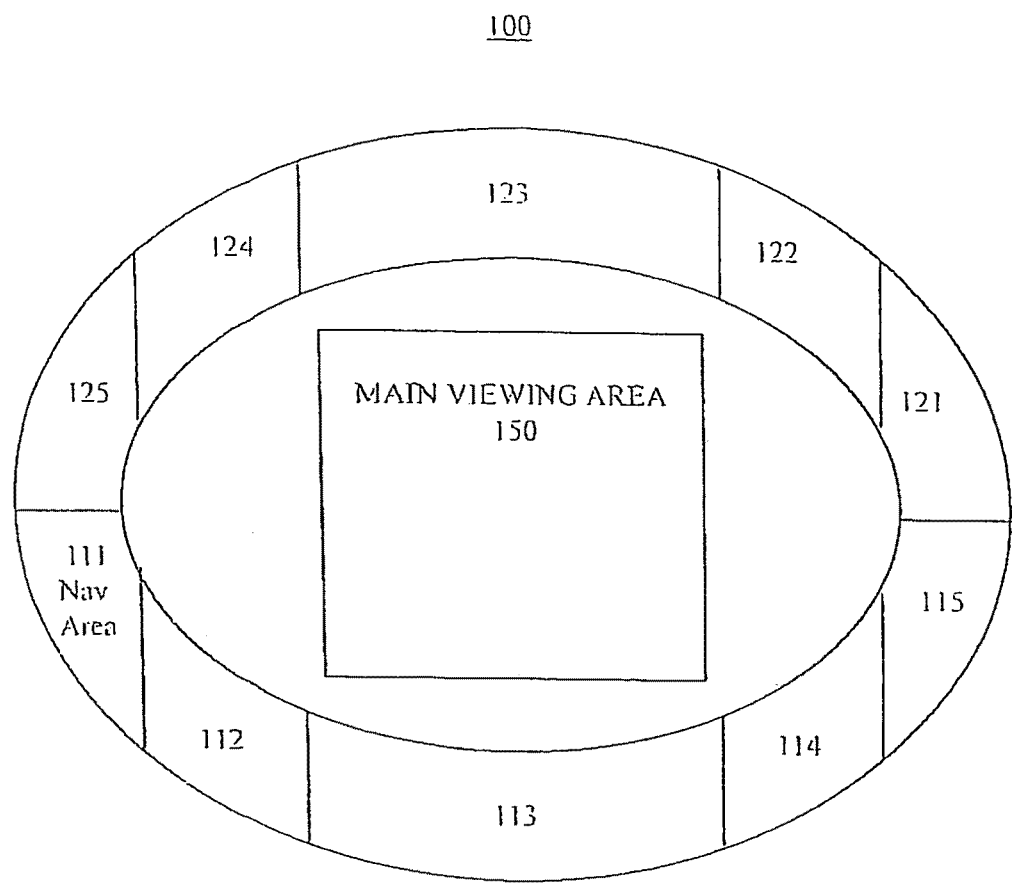
FIG. 1A is a block diagram of an exemplary rotational carousel video navigation presentation in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

Present invention systems and methods facilitate efficient and effective video user experience navigation and selection. In one embodiment, facilitating video user experience navigation includes forwarding information associated with presentation of a first perspective of a program in a main viewing area with information associated with simultaneous presentation of other perspectives of the same program in navigation viewing areas. The main viewing area can be associated with a presentation perspective (e.g., front, back, top, down, left right, etc.) a user is primarily interested in. The video navigation areas can display clips presenting content of a video from a different user experience perspective than the content presentation perspective in the main viewing area.

In one exemplary implementation, the main viewing area and navigation viewing areas are presented on a display monitor and a user can navigate perspectives by triggering replacement of or a change in the content perspective presented in a viewing area (e.g., replacing content perspective in the main viewing area with content perspective from a selected navigation viewing area, causing a movement, rotation or different arrangement in a navigation presentation, etc.). A user can peer through the simultaneously presented windows or navigation areas and experience the content differently (e.g., relative to different perspectives, different audio effects, etc). In this fashion, a user can experience and narrow in on a desired perspective much faster and more intelligently than through conventional attempts at video perspective presentation.

Figure 5:
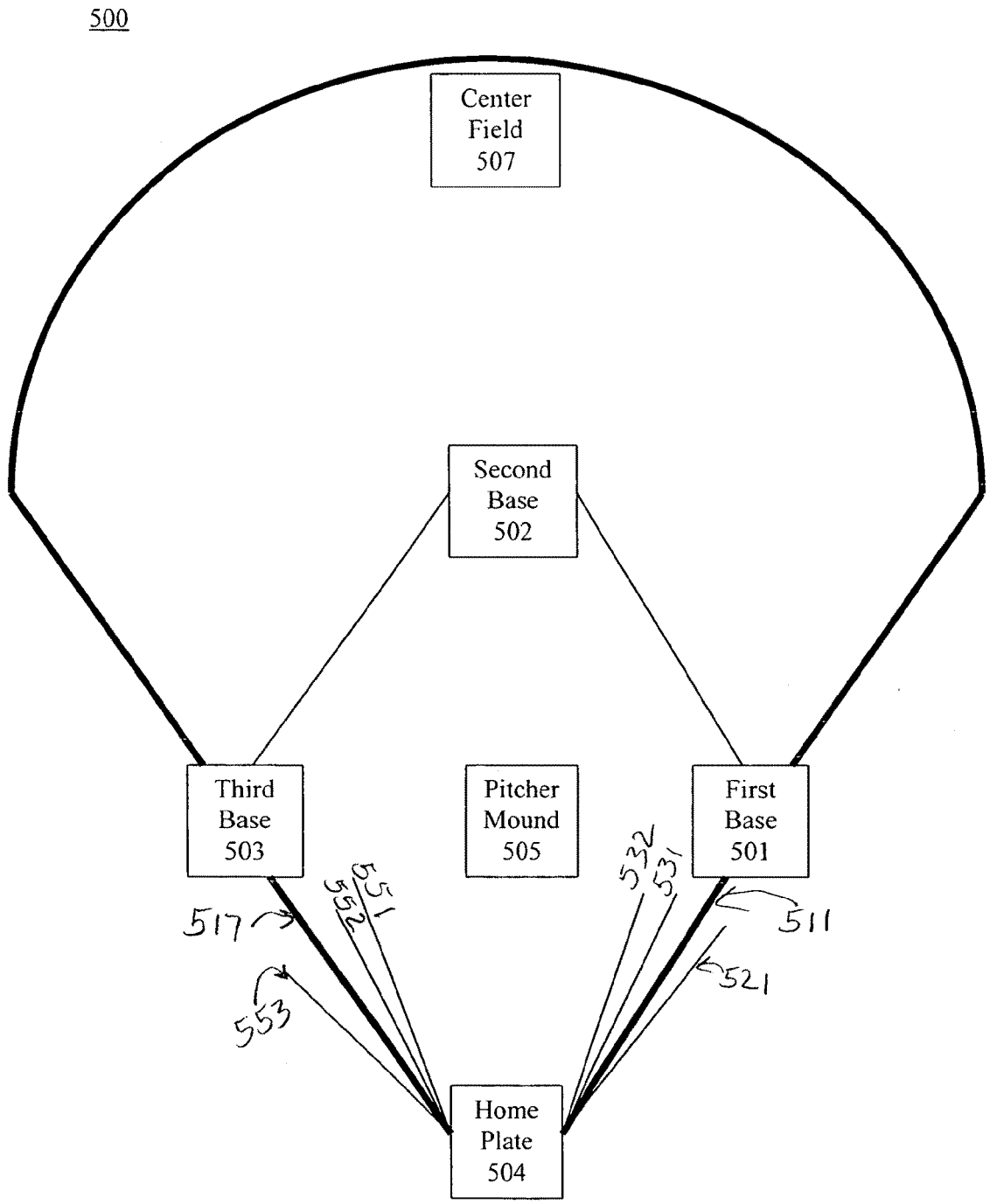
FIG. 5 is a diagram of an exemplary overhead view of a baseball field configuration.

In one exemplary implementation, a baseball game program is presented. FIG. 5 is a diagram of an exemplary overhead view of a baseball field configuration. Initially a main viewing area can present content from the perspective of a view from the pitcher mound 505 looking towards the batter at home plate 504. A first navigation area can present the content from the perspective of a view from the center field 507 behind the pitcher mound 505 looking towards the batter. A second navigation area can present the content from the perspective of an overhead view from a blimp looking down on the batter. A third navigation area can present the content from the perspective of a view along the first base line 511. A forth navigation area can present the content from the perspective of a view along the third base line 517. The main viewing area and navigation areas can present the same content action simultaneously from the different viewing perspectives.

It is appreciated that a variety of perspectives can be presented in the navigation viewing areas. The perspectives can be from the a first point looking towards a second point, third point, etc. (e.g., a batter at home plate 504 looking towards the pitcher mound 505, first base 501, third base 503, etc.). The perspectives can be from a second point, third point, etc. looking towards a first point (e.g., the pitcher mound 505, first base 501, third base 503, etc looking towards home plate 504). A first navigation viewing area can present a perspective from a first point towards a second point (e.g. the pitcher mound 505 towards home plate 504) and a second viewing area can present a perspective from a third point towards a forth point (e.g., first base 501, towards second). Providing different perspectives of the content can facilitate a user selectively focusing on different action in the content. For example, a first user can have the main viewing area display the content from the perspective of a pitcher on the pitcher mound 505 looking towards home plate 504 while a first navigation area displays the perspective from a runner on first base 501 looking towards the pitcher mound 505 and a second navigation area displays a view looking along the base line between first base 501 and second base 502. The present invention also facilitates direction of attention to different action with a presentation. For example, while a user is observing a first perspective of the action in the main viewing area (e.g., looking at a batter at home plate 504 from the perspective of the pitcher mound 505) the user can direct attention to other action (e.g., if a runner on first base 501 takes off for second base 502 the user can direct attention to the action in second navigation area to observe the run along the base line perspective from first base 510 to second base 502). The user can direct attention to a second perspective (e.g., the run along the base line perspective from first base 510 to second base 502) by observing the second viewing navigation area or triggering a switch of the second perspective content to the main viewing area.

In one embodiment, a processor (e.g., graphics processor, a central processor, or extensions thereof, etc.) is utilized to access one or more audio visual (AV) streams of concurrent multi-perspective information and display the sequences in a UI (User Interface). The accessed audio video streams are decoded (e.g., decompressed, decrypted, other activities associated with making content available, etc.). In one embodiment, a processor coordinates the presentation of the different perspective content segments in the navigation viewing areas and utilizes a number of graphics features to enable a variety of presentation effects including introduction of perspective, image dissolution or fading, scaling, transition effects, etc. In one exemplary implementation, processor graphics capabilities (e.g., vector processing, three dimensional rendering, scaling, zoom, texture, shading, master decoding, simultaneous decode, etc.) are utilized to enable presentation of the navigation viewing areas and associated content segments in a variety of configurations (e.g., carousel, helix, globe, etc.). The presentations can be configured to convey intuitive relationships of the content segments associated with perspective navigation viewing areas (e.g., navigation areas on the right are associated with perspectives to the right, navigation areas on top are associated with top perspectives, etc.).

A processor can control the perspective navigation presentation for abrupt changes in perspective navigation between the viewing areas (e.g., from one perspective to another) or the processor can introduce simulation or animation to present a transition smoothly (e.g., from one viewing perspective to another). It is appreciated that a variety of three dimensional processing capabilities can be utilized to facilitate implementation of transition effects. In one embodiment, transition effect perspectives are presented in navigation viewing areas. The transition effect perspectives can create a panning effect that "smoothes" transitions between viewing areas. In one exemplary implementation, a first concurrent multi-perspective stream is received (e.g., along a first base line 511) and a second concurrent multi-perspective stream is received (e.g., along a third base line 517). When changing between the perspectives of the two different concurrent multi-perspective streams transition effects are utilized to smooth the transition.

In one exemplary implementation of changing from a first base line perspective to a third base line perspective graphics processing capabilities are utilized to "smooth out" the transition. For example, a first frame of the first concurrent multi-perspective stream (e.g., along the first base line 511) is decoded and warped and presented in a viewing area. The second frame of the first concurrent multi-perspective stream is decoded and warped and then various graphics rendering is performed to render an image that is a simulation of a slightly different perspective (e.g., perspective 531). The third frame of the first concurrent multi-perspective stream is decoded and warped and again various graphics rendering is performed to render an image that is a simulation of greater difference in perspective (e.g., perspective 532.) The jump or transition occurs for the perspectives in the 541 region. The third frame of the second concurrent multi-perspective stream (e.g., along the third base line 517) is decoded and warped and again various graphics rendering is performed to render an image that is relatively far in perspective from the second concurrent multi-perspective stream (e.g., perspective 551.) The second frame of the second concurrent multi-perspective stream is decoded and warped and then various graphics rendering is performed to render an image that is a simulation of a slightly different perspective (e.g., perspective 552). The third frame of the second concurrent multi-perspective stream (e.g., along the first base line 511) is decoded and warped and presented in a viewing area. The utilization of graphics processing capabilities to generate simulated different perspectives permits the presentation to be appear to be "panned" towards a different concurrent multi-perspective stream and thus "smooth" out transitions.

It is appreciated that graphics processing capabilities can be utilized to create or simulate different perspectives for a variety of applications. For example, the simulated perspectives can have a variety of orientations or directions, (e.g., perspective 531 or 521 with respect to the first base line perspective 511, perspective 552 or 523 with respect to the third base line perspective 531, overhead towards a blimp, etc.). The simulated perspectives can be utilized without a full transition to another concurrent multi-perspective stream. For example, a first concurrent multi-perspective stream is a view from the end-zone of a football game and a second concurrent multi-perspective stream is a view from the side line of the football game. A simulated slightly different perspective from the end-zone towards the sideline can be presented without transitioning completely to the second concurrent multi-perspective stream associated with the view from the side line.

Figure 6:
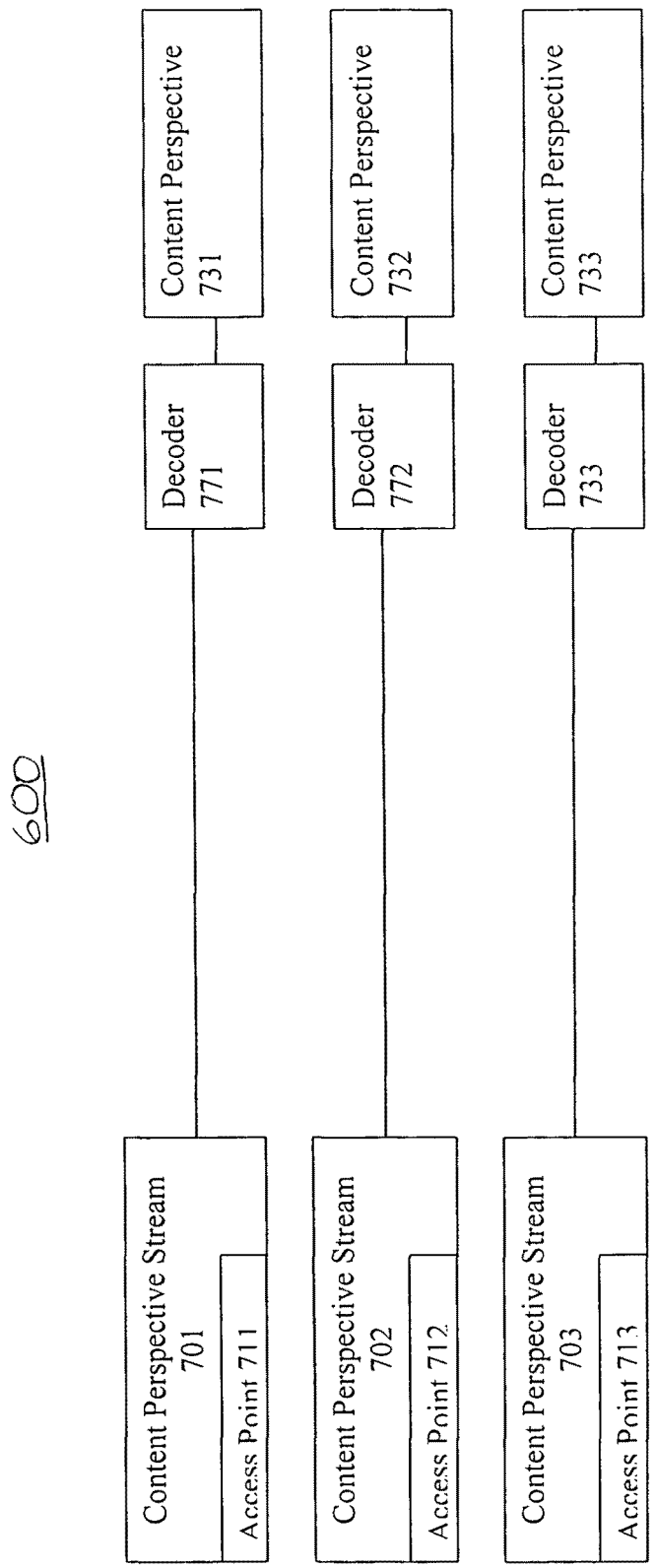
FIG. 6 is a block diagram of one exemplary concurrent multi-perspective video stream access point configuration in accordance with one embodiment of the present invention.

It is appreciated that the present invention is also flexibly adaptable to a variety of concurrent multi-perspective video stream access point implementations. FIG. 6 is a block diagram of one exemplary concurrent multi-perspective video stream access point configuration 600 in accordance with one embodiment of the present invention. Concurrent multi-perspective video stream access point configuration 600 includes first perspective stream 701 (e.g., along a first base line 511) with access point 711, second perspective stream 702 (e.g., along a third base line 517) with access point 172, and third perspective stream 703 (e.g., from home plate line 504) with access point 713. The content perspective streams 701, 702, and 703 are fed into decoders 711, 712 and 713 respectively which decode the stream information and forward respective content perspective navigation viewing area presentation or clip information 731, 732, and 733. The decoders 701, 702 and 703 can be combined in a single decoder or other configurations.

Figure 7:
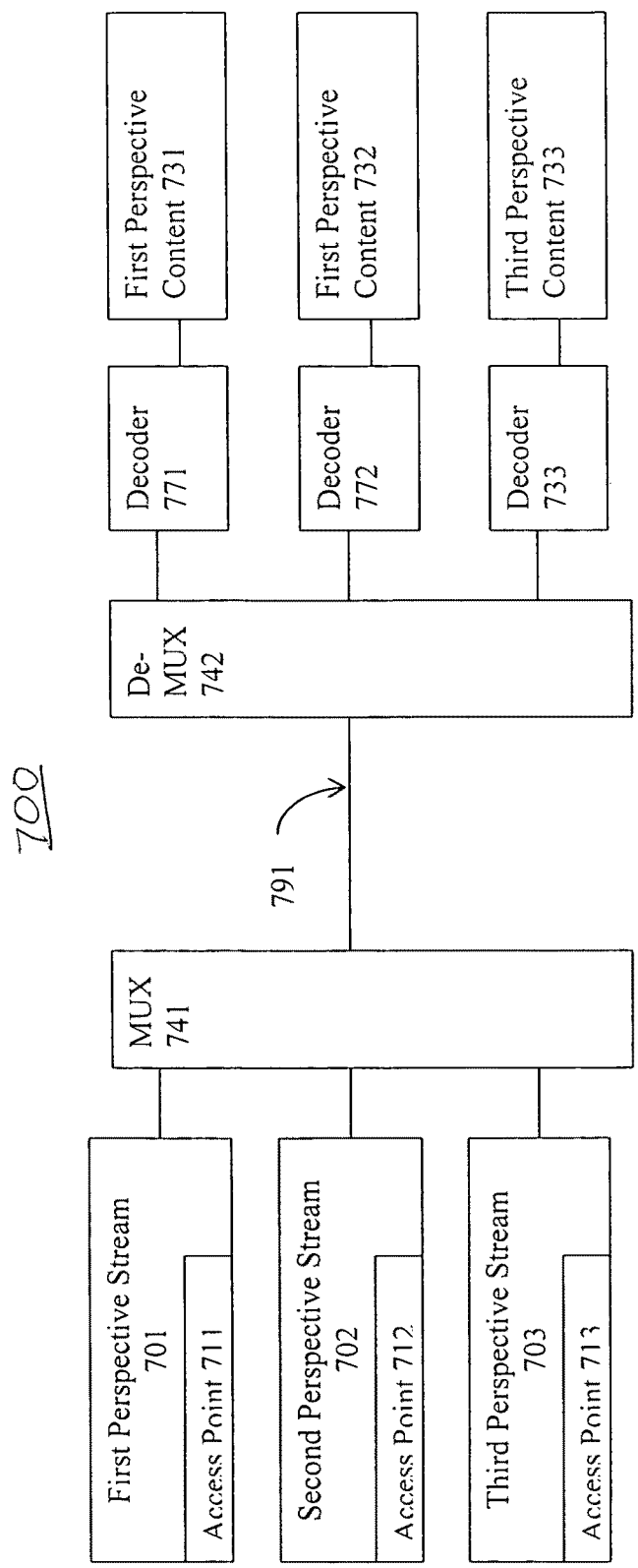
FIG. 7 is a block diagram of another exemplary concurrent multi-perspective video stream access point configuration in accordance with one embodiment of the present invention.

FIG. 7 is a block diagram of another exemplary concurrent multi-perspective video stream access point configuration 700 in accordance with one embodiment of the present invention. Exemplary concurrent multi-perspective video stream access point configuration 700 is similar to exemplary concurrent multi-perspective video stream access point configuration 600, except the content perspective streams are combined for transmission. For example, multiplexer 741 multiplexes information from the content perspective streams 701, 720 and 703 for transmission in a single stream 791 and de-multiplexer 742 de-multiplexes the information for decoding.

It is appreciated that dynamic flexibility is supported in presentation of the navigation viewing areas and associated content segments. The perspective relationships can include linear differences (e.g., there is a 10 degree perspective difference in the content of each progressive navigation viewing area, so that a first navigation area clip perspective is 10 degrees different from a main viewing area, a second navigation area clip perspective is 20 degrees different from the main viewing area, a fourth navigation area clip is 30 degrees different from the main viewing area, etc, etc.) or exponential differences (e.g., a first navigation area clip perspective is 10 degrees different from a main viewing area, a second navigation area clip perspective is 30 degrees different from the main viewing area, a fourth navigation area clip is 180 degrees different from the main viewing area, etc.). It is also appreciated that the navigation viewing areas can be presented in a variety of configurations (e.g., a rotational carousel, a double helix, etc.) and variety of perspective associations (e.g., a first helix going in a right hand perspective rotation, a second helix going in a left hand perspective rotation). In one exemplary implementation, application program interface features (e.g., Microsoft Direct X video acceleration features, other API interfaces, etc.) are utilized in decoding, rendering and presenting the perspective navigation content segments.

FIG. 1A is one exemplary implementation of video perspective navigation presentation 100 in accordance with one embodiment of the present invention. In one embodiment, the video perspective navigation presentation 100 includes navigation viewing areas configured in a rotating carousel. It is appreciated that video perspective navigation presentation 100 can be presented via a variety of display types (e.g., a display, a monitor, a television, a projection screen, etc.). Video perspective navigation presentation 100 includes a main viewing area 150, video navigation areas 111, 112, 113, 114, 115, 121, 122, 123, 124, and 125. In one embodiment, main viewing area 150 displays video content perspective a user is primarily interested in. The navigation viewing areas present different perspectives on content (e.g., towards the right, left, top, bottom, etc.) than the content in the main viewing area.

Figure 1B:
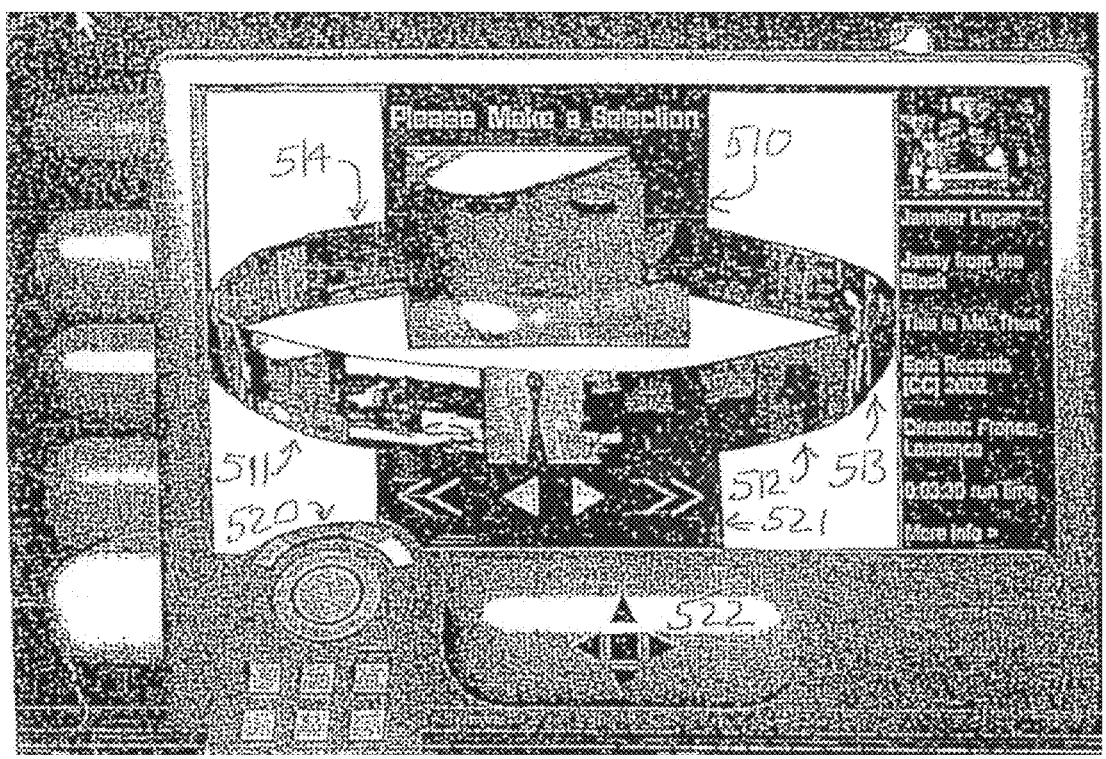
FIG. 1B another exemplary utilization of a user interface and navigation presentation in accordance with one embodiment of the present invention.

In one implementation, content segments are presented as shown in FIG. 1B, another exemplary utilization of a user interface and perspective navigation presentation in accordance with one embodiment of the present invention. The presentation of FIG. 1B includes main viewing area 510 and a plurality of navigation areas (e.g., 511, 512, 513 and 514) in a ring or carousel configuration. In one embodiment, the selection and control of the content displayed in the main viewing area 510 and navigation viewing areas (e.g., 511, 512, 513 and 514) can be implemented with remote controller 520, screen interface 521 (e.g., that includes selection arrows) and/or control button 522. The center video content is the content perspective a user is primarily interested and is primarily viewing and the carrousel of images represents the multiple perspectives that the user can jump to with cognizance of the content perspective. The user can spin the content perspectives in the carrousel to intelligently access content perspectives of interest.

Figure 1C:
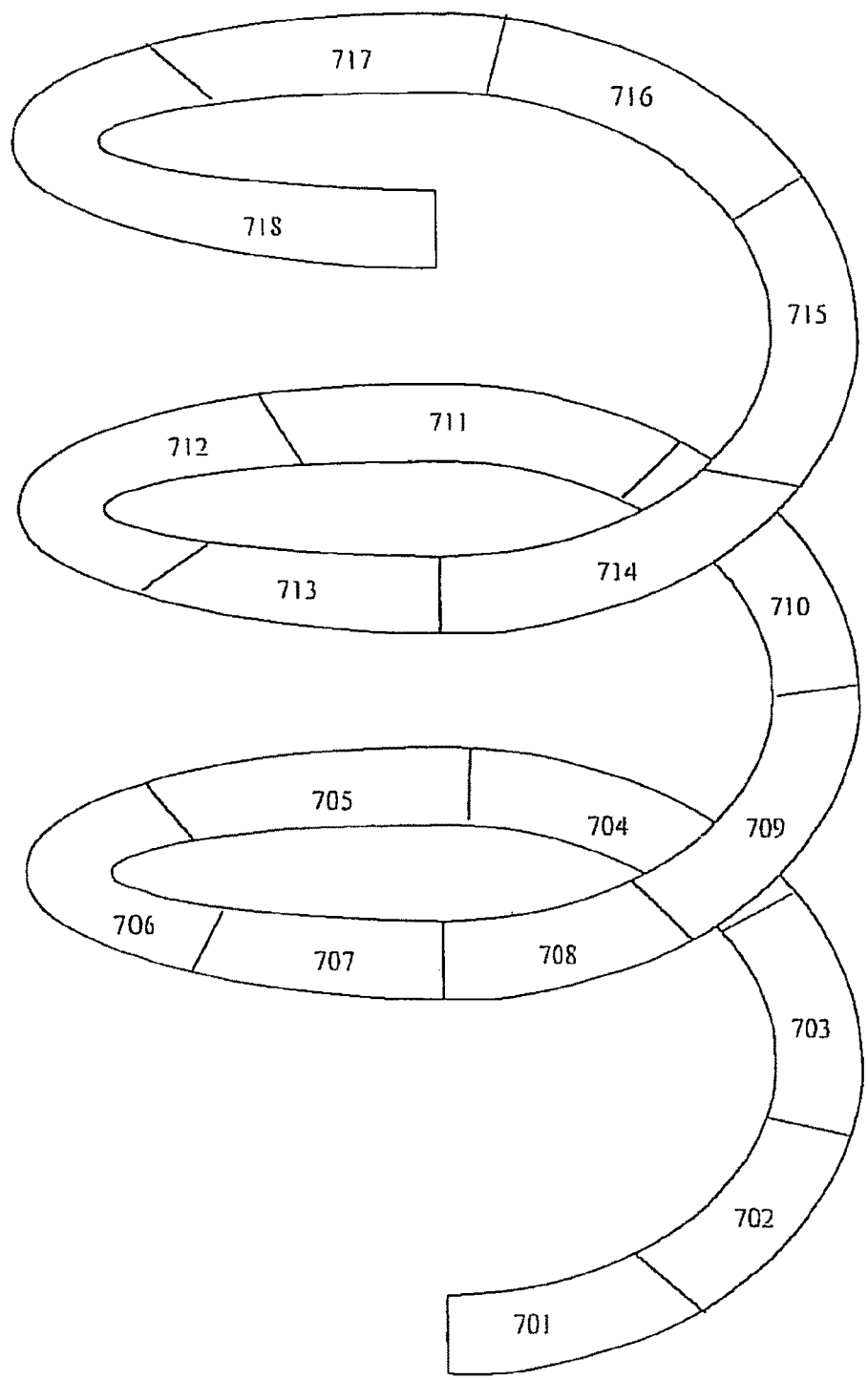
FIG. 1C is an exemplary helix video navigation presentation in accordance with one embodiment of the present invention.

It is appreciated the navigation viewing areas can be presented in a variety of configurations. The navigation viewing areas can be configured in accordance with exemplary rotational carousel video perspective navigation presentation 100 and 500, an exemplary globe perspective navigation interface presentation configuration 400, a helix video perspective navigation presentation, double helix video perspective navigation presentation, in a raster pattern, along a display edge, etc. FIG. 1C is an exemplary helix video perspective navigation presentation in accordance with one embodiment of the present invention. The exemplary helix perspective navigation presentation includes navigation viewing areas 701 through 718 configured in a helix arrangement. It is appreciated that similar to movements in the carousel or ring of FIG. 1A and the globe of FIG. 1F, movements or rotations in the helix can correspond to perspective relationships. In one embodiment, there are more content perspectives available than viewing areas in a helix viewing configuration (e.g., 30 content perspective streams available and 20 navigation viewing areas, 40 content perspective streams and 5 navigation viewing areas, etc.) and as the helix rotates content from additional perspectives can be added or "fed" into the helix top or bottom.

Figure 1E:
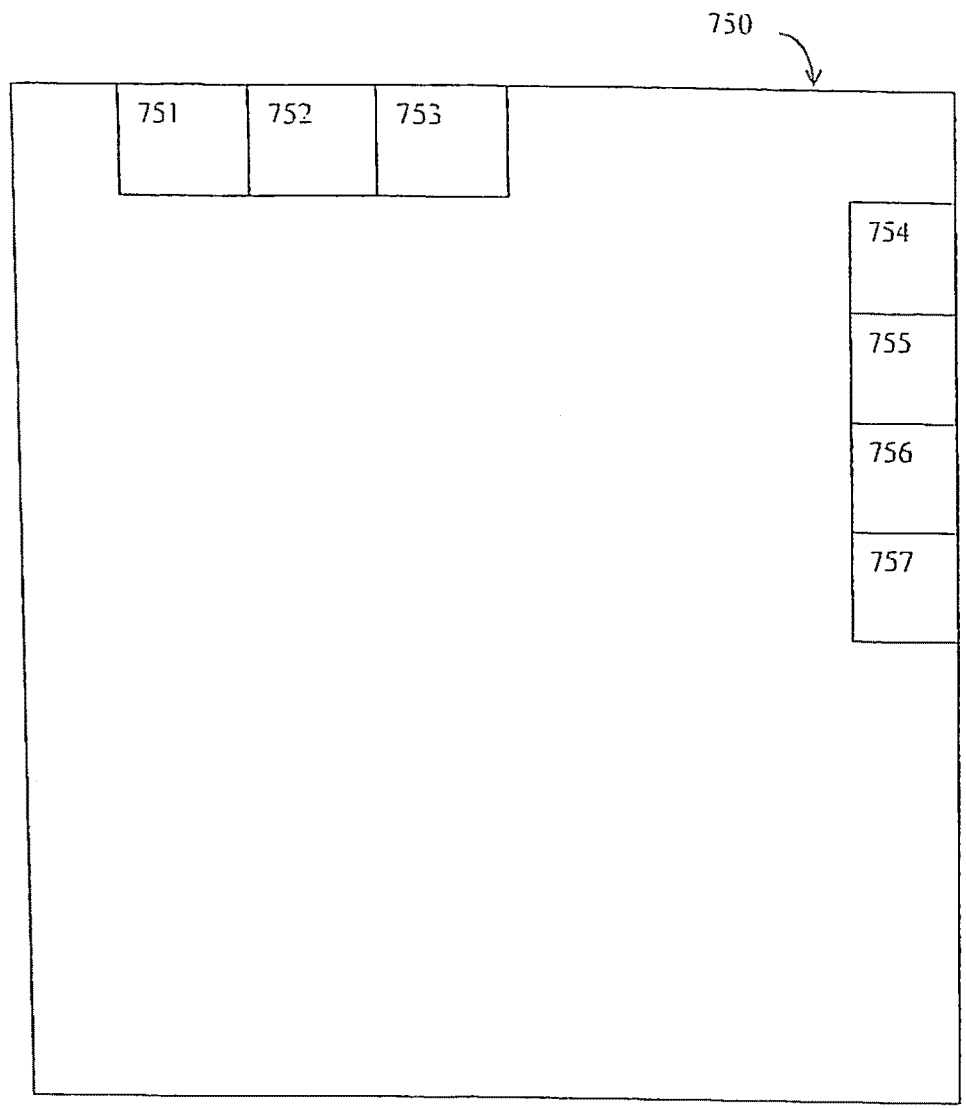
FIG. 1E is an exemplary edge navigation presentation in accordance with one embodiment of the present invention.

FIG. 1D is an exemplary raster pattern video perspective navigation presentation in accordance with one embodiment of the present invention. The exemplary raster pattern video perspective navigation presentation includes video navigation areas 720 through 731 arrange in rows and columns. FIG. 1E is an exemplary edge pattern perspective navigation presentation in accordance with one embodiment of the present invention. The exemplary edge video navigation presentation includes navigation areas 751 through 753 on a top edge of presentation 750 and/or navigation areas 754 through 757 on a side edge. It is appreciated that the navigation areas can occupy the entire edge of a presentation or a portion thereof, including the top, bottom, right and/or left edges. It is also appreciated that the present invention can be implemented in many more navigation area configurations which are not exhaustively presented in order not to obfuscate the invention. It is also appreciated that a main viewing area can also be presented concurrently with a globe, helix, raster and/or edge configurations of navigation areas. In one exemplary implementation, a main viewing area (not shown) similar to main viewing area 150 or 510 can be presented in center of presentation 750 with the navigation areas 751 through 757 presented concurrently on the edges.

The navigation viewing areas can appear to move. The movement or change in spatial relationship can correspond to changes in perspective relationships of the content presentation. For example, the carousel ring configurations of FIG. 1A and FIG. 1B or the globe configuration of FIG. 1F can appear to remain stationary or rotate (e.g., in a carousel fashion, spin like a globe, etc.). In one embodiment, navigation areas presenting content that is closer in perspective to the content in the main viewing area are presented in the "front" of a ring or "center" of a globe. In one exemplary implementation, as the content in main viewing area 150 of FIG. 1 progresses through perspective changes the content perspective in viewing area 114 is moved to viewing area 113, the content perspective from viewing area 115 is moved to viewing area 114, etc.

As indicated above, the present invention is readily adjustable for a variety of perspective relationships between the content in the main viewing area and the perspective of content in the navigation areas. In one embodiment, as content in navigation areas are selected for presentation in the main viewing area, the perspective intervals shift to repeat the pattern making the nearer perspective presentation differences more granular.

Figure 1F:
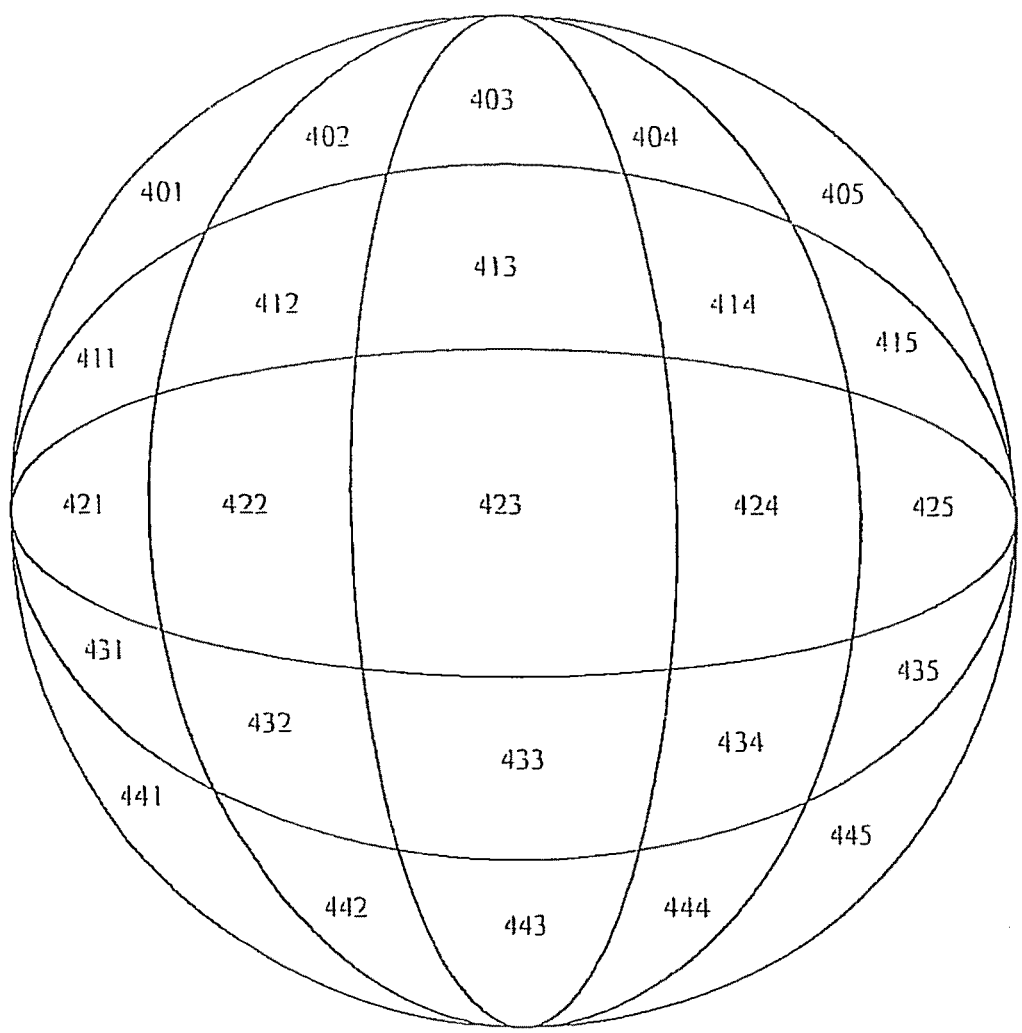
FIG. 1F is a block diagram of an exemplary globe navigation interface presentation configuration in accordance with one embodiment of the present invention.

FIG. 1F is a block diagram of an exemplary globe navigation interface presentation configuration 400 in accordance with one embodiment of the present invention. Globe navigation interface 400 includes navigation viewing areas 401 through 445. In one embodiment, the horizontal orientation of the globe navigation interface 400 corresponds to viewing perspective access points within the content and the vertical orientation corresponds to different audio perspective access points.

In one embodiment, navigation areas 403, 413, 423, 433, and 443 are associated with a first viewing perspective of primary interest and/or default (e.g., a view from center field, a view from pitchers mound, etc.). Navigation areas 401, 411, 421, 431, and 441 are associated with a second viewing perspective (e.g., from a blimp, from an overhead camera etc.). Navigation areas 402, 412, 422, 432, and 442 are associated with a third perspective (e.g., along the first base line, etc.). Navigation areas 404, 414, 424, 434 and 444 are associated with a fourth perspective (e.g., along the third base line, etc.). Navigation areas 405, 415, 425, 435, and 445 are associated with a fifth perspective (e.g., behind the umpire, etc.).

It is appreciated the present invention interfaces can be utilized to navigate and select a variety of user experience features. As previously indicated the navigation areas are mapped to different viewing perspectives of content. In one embodiment, aspects of audio effects can be mapped to the navigation area presentation for enhancing audio control. For example, the navigation areas can be mapped to or associated with audio perspective and calibration (e.g., adjusting emphasis of sounds from different perspectives, adjusting audio effects corresponding to a right speaker or left speaker perspective, increasing amplitude, decreasing amplitude, adjusting bass, etc.).

In one example, the navigation areas can be associated with speakers in a presentation area. FIG. 4 is a block diagram of an exemplary presentation area in accordance with one embodiment of the present invention. The presentation is being displayed on a display 491 (e.g., television, monitor, projection screen, etc.) and audio is transmitted from speakers 481 through 489. In one exemplary implementation, navigation area 433 is associated with a speaker in front of the primary user area 492 (e.g., speaker 481), navigation area 432 is associated with a speaker in front and to the left of the primary user area 492 (e.g., speaker 482), navigation area 434 is associated with a speaker in front and to the right of the primary user area 492 (e.g., speaker 489). navigation area 422 is associated with a speaker to the left of the primary user area 492 (e.g., speaker 483), navigation area 424 is associated with a speaker to the right of the primary user area 492 (e.g., speaker 488), navigation area 413 is associated with a speaker behind the primary user area 492 (e.g., speaker 485), navigation area 433 is associated with a speaker behind and to the left of the primary user area 492 (e.g., speaker 484) and navigation area 434 is associated with a speaker behind and to the right of the primary user area 492 (e.g., speaker 484). In one exemplary implementation, selecting a navigation area increases the user experience impact of audio effects associated with the corresponding speaker.

The globe in FIG. 1A can "spin" vertically or horizontally. Content and program streams can be "added" or "removed" from the globe presentation based upon the "rotation". For example, video content associated with different channels (e.g., as representative of different angles) can be added or deleted from the globe. In one embodiment the globe spins in response to user input.

In one embodiment, a user can trigger a change in the perspective of the video content of the main viewing area and navigation areas. In one exemplary implementation a user can indicate a video perspective navigation "skip" or "jump" in which content perspective starting at an access point associated with a navigation area is "moved" to or presented in the main area. It is appreciated that a skip or jump can "go" in a variety of three dimensional (3D) directions of video content perspective (e.g., right, left, top, bottom, front, back, etc). The perspective navigation areas can then be automatically updated with different content perspective clips or segments in accordance with a perspective relationship to the content being displayed in the main viewing area. In one exemplary implementation, as content is "rotated" to the front of a carousel the perspective granularity changes in the content segments can be reduced and as content is "rotated" to the back navigation areas the content perspective changes can be increased.

It is appreciated that navigation interfacing can be facilitated in a number of different ways. In one exemplary implementation, a user can select or "grab" the content in a navigation viewing area and move it to another navigation area or main viewing area. The movement can be presented as an abrupt movement (e.g., a first frame and then a sudden jump to a nonsequential frame) or can include animation to give a user a perception of the movement. In one exemplary implementation, when a content segment of a navigation area is selected for movement to the main viewing area, an animation showing the transition is presented and perspective compensation changes can be included. There can also be an animation or transition simulation presentation and perspective compensation changes included to represent a content segment "movement" from the main viewing to a navigation viewing area. In one exemplary implementation, as the "movements" of content segments between navigation viewing areas occur, the carousel or globe of navigation areas appears to rotate corresponding to movement of the content segments. The speed of the rotation can also be captured in the animation to provide the user with a perspective of how fast the carousel or globe is rotating.

In one embodiment, different content perspective information is included in different video streams. Each video stream is associated with a main viewing area or navigation viewing area. The presentation of a perspective in the main viewing area or navigation viewing areas can change by changing the association of access pointers in the video streams to the main viewing area or respective navigation viewing areas. For example, changing the assignment of a first stream access pointer from a first navigation viewing area to and an assignment with a second navigation viewing area.

In one embodiment, different content perspective information is included in a single video stream with multiple access points. Each access point corresponds to a different perspective and is associated with a main viewing area or a navigation viewing area. In one exemplary implementation, the decoding of the video stream is time division multiplexed between information associated with the different perspectives and information associated with the plurality of different perspectives, and is decoded within frame decoding time constraints. Again, the presentation of a perspective in the main viewing area or navigation viewing areas can change by changing the association of access pointers in the video streams to the main viewing area or respective navigation viewing areas. For example, changing the assignment of a first stream access pointer from a first navigation viewing area to and an assignment with a second navigation viewing area.

As indicated above, access pointers associated with the main viewing area and navigation areas can change association. In one embodiment, movement of content presentation perspectives between the navigation areas trigger changes in the association of an access pointer to the main viewing area and navigation viewing areas. A right hand rotation of a navigation area carousel can indicate a right hand movement in program content viewing perspective. With reference to FIG. 1A, in one exemplary implementation if a user "moves" a perspective of the content segment associated with content presented in navigation area 115 to navigation area 113 it can appear as through the carousel moved in a clockwise direction as the navigation performs the change in the perspective of the content presentation. Alternatively, if navigation area 111 is associated with a different content perspective, the "movement" of a content perspective from navigation area 111 to navigation area 113 can appear as a counter clockwise rotation.

In one embodiment, a user can close or open the navigation capabilities. In one exemplary implementation, when a user closes or deactivates the perspective navigation viewing areas, the main viewing area or block occupies the whole display and when a user opens or activates the perspective navigation viewing areas they are presented either with the main viewing block or by themselves. It is appreciated that the navigation capabilities can be opened or closed based upon an automatic trigger. For example, navigation viewing areas can be opened automatically when a program or angle is initially selected. The navigation viewing areas can be automatically closed after a certain duration of time, after a user selects one of the skip option blocks to be displayed in the main viewing block, etc. It is appreciated that animation, zoom and perspective alterations can be handled automatically.

It is appreciated that decoding operations associated with the present invention can be accomplished by a plurality of processing resources working individually or together in a variety of combinations. In one embodiment, a first portion of a video stream is decoded by a central processor and a second portion of a video stream is decoded by a graphics processor. The video streams can be the same or different video streams. In one exemplary implementation, the central processor decodes a portion of the video stream associated with a first navigation viewing area and the graphics processor decodes a portion of the video stream associated with a second navigation viewing area. Alternatively, the decoding can be performed by multiple central processors or multiple graphics processors. For example, the decoding can be performed by a first central processor and a second central processor, the decoding can be performed by a graphics processor and a central processor, or a portion of the decoding can be performed by a central processor and a portion performed by a graphics processor times two. It is also appreciated that an application specific integrated circuit (ASIC) can perform operations associated with the present invention. In one embodiment, a dedicated ASIC is utilized to decode a video stream (e.g., a Blu-ray decoder chip, other ASIC, etc.).

Figure 2:
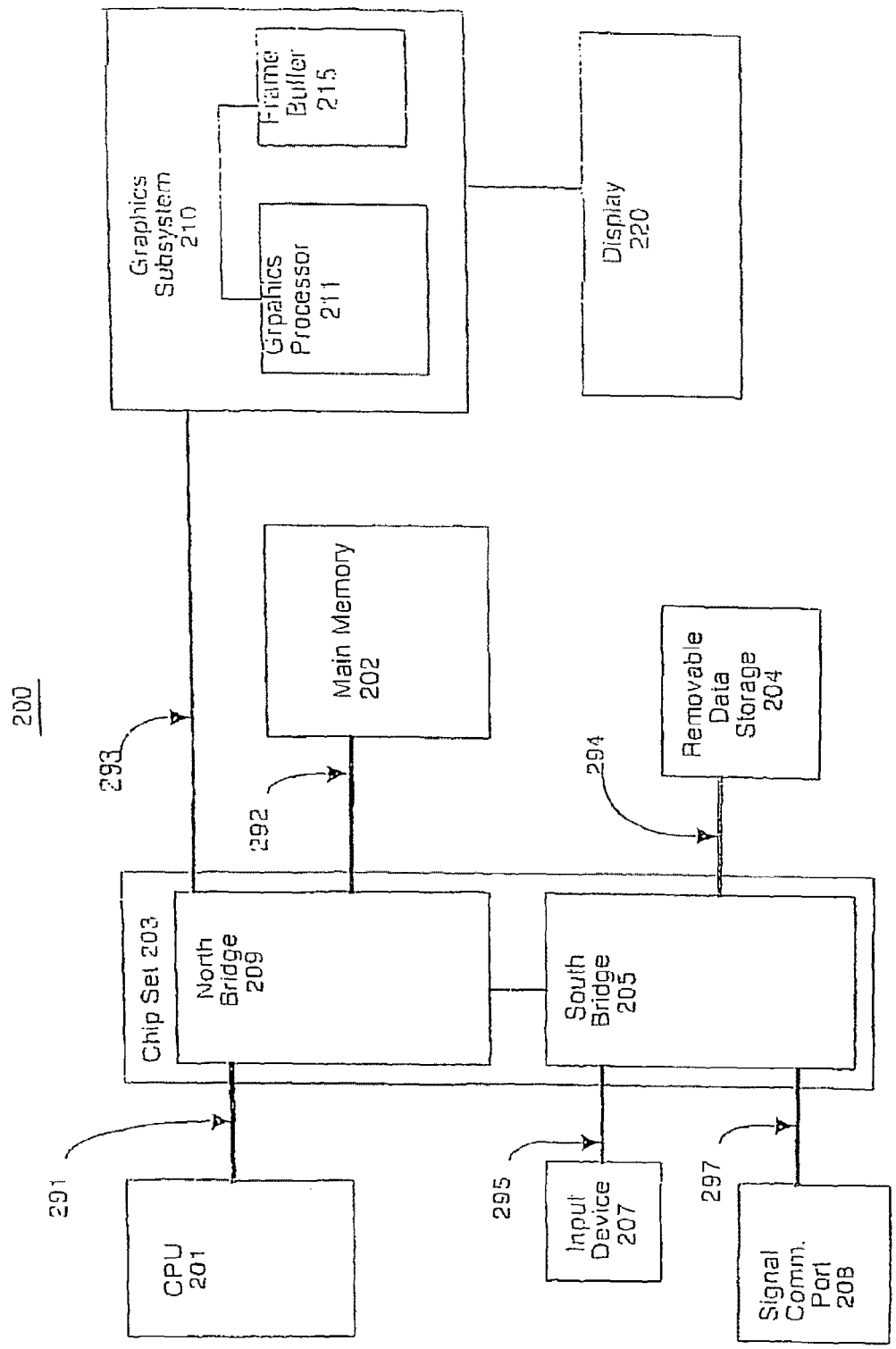
FIG. 2 is a block diagram of an exemplary video information control system, one embodiment of a computer system upon which embodiments of the present invention can be implemented.

FIG. 2 is a block diagram of an exemplary video information control system 200, one embodiment of a computer system upon which embodiments of the present invention can be implemented. Computer system 200 includes central processor unit 201, main memory 202 (e.g., random access memory), chip set 203 with north bridge 209 and south bridge 205, removable data storage device 204, input device 207, signal communications port 208, and graphics subsystem 210 which is coupled to display 220. Computer system 200 includes several busses for communicatively coupling the components of computer system 200. Communication bus 291 (e.g., a front side bus) couples north bridge 209 of chipset 203 to central processor unit 201. Communication bus 292 (e.g., a main memory bus) couples north bridge 209 of chipset 203 to main memory 202. Communication bus 293 (e.g., the Advanced Graphics Port interface) couples north bridge of chipset 203 to graphic subsystem 210. Communication buses 294-297 (e.g., a PCI bus) couple south bridge 205 of chip set 203 to removable data storage device 204, input device 207, and signal communications port 208 respectively. Graphics subsystem 210 includes graphics processor 211 and graphics buffer 215.

The components of computer system 200 cooperatively operate to provide presentations of graphics images. Communications bus 291 through 297 communicate information. Central processor 201 processes information. Main memory 202 stores information and instructions for the central processor 201. Main memory 202 also stores information for directing the controlling of the video access point selection between multiple access points in a video stream. Removable data storage device 204 also stores information and instructions (e.g., functioning as a large information reservoir). Input device 206 provides a mechanism for inputting information and/or for pointing to or highlighting information on display 220. Signal communication port 208 provides a communication interface to exterior devices (e.g., an interface with a network). Display device 209 displays information in accordance with data stored in frame buffer 215. Graphics processor 211 processes graphics commands from central processor 401 and provides the resulting data to graphics buffer 215 for storage and retrieval by display monitor 220. Graphics process 211 can also control video access point selection between multiple access points in a video stream. It is appreciated that central processor unit 210 can also be utilized to participate in controlling video access point selection.

In one embodiment, the graphic processor 211 includes multiple source filters where sources are defined as access points to a compressed AV stream. In one exemplary implementation, a processor effectively processes concurrent multi-perspective video stream information by accessing the streams at multiple points. The processor can perform multiple demultiplex filtering for stripping a program stream of its AV elements for decode and time division multiplexed decompression for establishing multiple perspective navigation clip information at different times in a normal sequence presentation. In one embodiment, the multiple demultiplexing takes the content "of" the transport carrier and results in a program stream of audio video data. The processor can also perform fast decompression context switching. In one embodiment, the fast context switching is at a minimum 1/n frame rate, where n equals the number of concurrent access points. In one exemplary implementation, memory access and flushing is governed by a multimedia application program interface (API) and the buffers can be directed to operate on different hierarchies. For example, a processor may be working on inverse discrete cosine transform, motion compensation, inverse quantization, etcetera, and each one can have a fast context switch. It is not limited to the processor decoding one portion of a video stream and then another portion, within operations directed to each of the video stream portion decodes there can be a context switch to other hierarchy operations. In one embodiment, a context switch includes flushing a pipeline, loading a different set of unrelated data in the pipeline and processing the loaded data. After the processing the pipeline is flushed again, another different set of unrelated data is loaded and processed while another part of the chip is rendering and controlling display of the results. The sequence of context switch facilitates serial processing of multithread video. In one embodiment, the context switching includes decrypting.

In one embodiment, the graphics processor performs a number of graphics processing functions while preparing the navigation presentation information. In one embodiment, the information forwarded by the processor includes information associated with overlay blending, and background capture (e.g., other than the present channel or main viewing area presentation capture). The processor performs texture mapping for mapping decompressed video onto three dimensional objects for three dimensional or perspective contextual varying content navigation. The processor can also perform decompression of single intra frame and conversion to single frame elements for navigation clip thumbnail generation. In one exemplary implementation, the processor includes a multi-stream scalar and compositor to scale decoded/decompressed video into picture in picture (PIP) windows and give the presentation perspective.

In one embodiment, a variety of audio visual devices (not shown) can be coupled to computer system 200 including a television receiver (e.g., for receiving television signals from a satellite, cable, etc), a DVD player, a CD player, a digital video recorder or DVR (e.g., for storing audio video files including MPE-2 compressed files in digital format, files from television transmission, from a DVD, downloaded from the Internet, etc.). Computer system 200 can also be configured to receive control signals from a variety of user input mechanisms, including a remote control, a cursor control device, terrestrial cable, satellite, etc.

FIG. 3 is a flow chart a video information control method 300 in accordance with one embodiment of the present invention. In one embodiment, video information control method 300 facilitates navigation control of video content perspectives.

At block 310, concurrent multi-perspective video stream information is received. The concurrent multi-perspective video stream information includes information associated with different video perspectives. In one embodiment, the concurrent multi-perspective video stream information is associated with a user experience perspective associated with content. For example, the user experience perspective can include viewing the content from a different perspective. The user experience can also include audio effects from a different experience perspective. The video stream information can be received in a single stream or a plurality of streams. In one embodiment, the video stream information is associated with a program. In one exemplary implementation, the video stream is associated with a concurrent multi-angle television or IPTV broadcast or program (e.g., sporting event, movie, series, news broadcast, etc.).

At block 320, video access point selection between multiple access points associated with different perspectives in the concurrent multi-perspective video stream information is controlled. In one embodiment, the controlling includes creation of perspective navigation clip information associated with the concurrent multi-perspective video stream information based upon selection of the multiple access points. The perspective navigation clip information can include video frames and sequence information for enabling content perspective navigation. In one exemplary implementation, the controlling also includes accessing a compressed video or audio video (AV) stream and decoding the AV stream to create the information associated with the perspective navigation clip. The compressed video or audio video (AV) stream can be accessed at specific time intervals and decoding the AV stream at the specific time intervals. The controlling can also include adjusting granularity of differences of the perspective navigation clips associated with each of the multiple access points. In one embodiment, graphics processing is selectively performed to create simulated perspectives of the content.

At block 340, presentation information (e.g., rendering information, etc.) for each of the multiple access points is forwarded. In one embodiment, the presentation information is forwarded to a user interface. The forwarding can include forwarding information associated with a plurality of the multiple access points for simultaneous presentation. In one exemplary implementation, the information includes information associated with a main viewing area and a navigation clip viewing area.

In one embodiment of a video information control method multiple video streams are received. Controlling of the video access point selection includes controlling access between multiple access points within each video stream and also across multiple video streams. In one exemplary implementation, the video access point selection is controlled between multiple access points within each video stream and across multiple video streams.

It is appreciated the present invention is readily adaptable to a variety of user interfaces and programming information. In one embodiment, the present invention is readily adaptable for utilization with a three dimensional (3D) user interface as described in co-pending patent entitled Apparatus and Method for 3D Electronic Program Guide Navigation; application Ser. No. 10/609,204; filed Jun. 27, 2003 which is incorporated herein by this reference. For example, navigation loop video playback loops can be presented in navigation areas corresponding to the media thumbnails 1405 and/or polyhedron 1450. FIG. 5 is another exemplary utilization of a user interface and navigation presentation in accordance with one embodiment of the present invention. The center video content is the content a user is primarily interested and where in time the user is primarily viewing and the carrousel of images represents the multiple access points in time that the user can jump to with cognizance of the content. The user can spin the carrousel to intelligently access video of interest.

While portions of the detailed description have been described in terms of video extraction and presentation in navigation, it is appreciated that embodiments can include a variety of content extraction. For example, embodiments can include audio visual (AV) content extraction, still frame extraction, etcetera, and the extracted content can be forwarded for presentation in navigation areas or windows. It is appreciated that audio associated with content of the main viewing area or navigation areas can be presented Thus, the present invention facilitates improved digital video navigation capabilities. By presenting a variety of different concurrently multi-perspective navigation views a user can navigate closer to a desired presentation perspective in an intuitive and timely manner. The number of jumps and uncertainty in the skips to different perspectives are reduced. Flexibility and concurrency in different perspectives and presentation of navigation windows facilitates improved user experience.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A video information control method comprising:
   receiving concurrent multi-perspective video stream information;
   controlling concurrent multi-perspective video information generation based upon multiple access points associated with different perspectives, said multiple access points corresponding to access points in said concurrent multi-perspective video stream information;
   using a processor that includes a variety of graphics features to enable presentation of navigation viewing areas and associated content segments in a variety of configurations including presentations configured to convey intuitive relationships of content segments associated with perspective navigation viewing areas;
   forwarding rendering information corresponding to each of said multiple access points.

2. A video information control method of claim 1 wherein said controlling includes creating perspective navigation clip information associated with said video stream based upon selection of said multiple access points.

3. A video information control method of claim 1 wherein said perspective navigation clip information includes video frames and sequence information for enabling navigation of content perspectives.

4. A video information control method of claim 1 wherein said concurrent multi-perspective video stream includes an audio video stream and said controlling comprises:
   accessing a compressed version of said concurrent multi-perspective video information; and
   decoding said compressed version of said audio video stream to create said information associated with said navigation clip.

5. A video information control method of claim 4 wherein said controlling further comprise simulating differences in perspective associated with each of said concurrent multi-perspective.

6. A video information control method of claim 1 wherein said forwarding includes forwarding information associated with a plurality of said multiple access points for simultaneous presentation of concurrent multiple perspectives.

7. A video information control method of claim 1 wherein said rendering information includes information associated with a main viewing area and a different perspective viewing area.

8. A video information control method of claim 1 wherein said controlling includes automatically creating different perspective clips for navigation viewing areas based upon different viewing perspectives relative to a perspective presented in a current main viewing area.

9. A video information control system comprising:
- a processor for controlling video access point selection between multiple concurrent multi-perspective video stream access points associated with different perspectives and organizing navigation clip information, wherein said processor performs texture mapping for mapping decompressed video onto three dimensional objects for three dimensional content navigation of different perspectives;
- a memory for storing information, including information for directing said controlling of said video access point selection between multiple video stream access points and organization of said navigation clip information; and
- a bus for communicating said information.

10. A video information control system of claim 9 wherein said processor includes multiple source filters where sources are defined as access points to at least one compressed audio video stream.

11. A video information control system of claim 9 wherein said processor performs multiple demultiplex filtering for stripping program streams of its audio video elements for decode and time division multiplexed decompression for establishing multiple navigation clip information associated with different perspectives.

12. A video information control system of claim 9 wherein said processor performs fast decompression context switching.

13. A video information control system of claim 9 wherein said processor performs perspective transition operations including simulation of perspectives between said multiple concurrent multi-perspective video streams associated with different perspectives.

14. A video information control system of claim 9 wherein said processor performs decompression of single intra frame compressed frame and conversion to single frame elements for navigation clip thumbnail generation.

15. A video information control system of claim 9 wherein said processor includes a multi-stream scalar to scale decoded/decompressed video into picture in picture (PIP) windows.

16. A video navigation system comprising:
- a processor for controlling video access point selection between multiple video stream access points, wherein said access points are associated with different perspectives, wherein said processor includes a variety of graphics features to enable presentation of navigation viewing areas and associated content segments in a variety of configurations including presentations configured to convey intuitive relationships of content segments associated with perspective navigation viewing areas;
- a memory for storing information, including information for directing said controlling of said video access point selection between multiple access points in a video stream; and
- a display for presenting said information.

17. A video navigation system of claim 16 wherein said information includes navigation clip information that correspond to said different perspectives.

18. A video navigation system of claim 16 wherein said information includes information associated with a navigation clip carousel presentation, wherein said carousel presentation includes navigation viewing areas corresponding to said different perspectives are organized in a carousel configuration.

19. A video navigation system of claim 16 wherein said information includes information associated with a navigation clip globe presentation, wherein said globe presentation includes navigation viewing areas corresponding to said different perspectives are organized in a globe configuration.

* * * * *